US008724721B2

(12) United States Patent
Soler Garrido (10) Patent No.: US 8,724,721 B2
(45) Date of Patent: May 13, 2014

(54) METHOD AND APPARATUS FOR CREST FACTOR REDUCTION

(75) Inventor: Josep Vicent Soler Garrido, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 13/032,347

(22) Filed: Feb. 22, 2011

(65) Prior Publication Data

US 2011/0228872 A1 Sep. 22, 2011

(30) Foreign Application Priority Data

Feb. 22, 2010 (GB) .................................. 1002971.8

(51) Int. Cl.
*H04L 27/28* (2006.01)
*H04B 15/00* (2006.01)

(52) U.S. Cl.
USPC ........... 375/260; 375/259; 455/500; 455/501; 455/39

(58) Field of Classification Search
USPC .......................................... 455/501; 375/260
See application file for complete search history.

(56) References Cited

U.S. PATENT DOCUMENTS

| 5,246,039 | A * | 9/1993 | Fredriksson | 139/452 |
|---|---|---|---|---|
| 2004/0218689 | A1 * | 11/2004 | Akhtman | 375/296 |
| 2007/0116142 | A1 * | 5/2007 | Molander | 375/260 |
| 2009/0103639 | A1 * | 4/2009 | Sankabathula et al. | 375/260 |
| 2009/0191907 | A1 * | 7/2009 | McCallister et al. | 455/501 |
| 2010/0150256 | A1 * | 6/2010 | Morris et al. | 375/260 |
| 2012/0150934 | A1 * | 6/2012 | Fifield | 708/310 |

FOREIGN PATENT DOCUMENTS

| JP | 2009-516422 A | 4/2009 |
|---|---|---|
| WO | WO 2006/041054 A1 | 4/2006 |

OTHER PUBLICATIONS

Electronic Communications Committee (ECC) within the European Conference of Postal and Telecommunications Administrations (CEPT), "ECC Recommendation (06)01," May 4, 2006, ECC.*
Office Action issued Jul. 3, 2012 in Japanese Patent Application No. 2011-035563 with English language translation.

* cited by examiner

*Primary Examiner* — Chieh M Fan
*Assistant Examiner* — Michelle M Koeth
(74) *Attorney, Agent, or Firm* — Oblon, Spivak, McClelland, Maier & Neustadt, L.L.P.

(57) ABSTRACT

According to embodiments there is provided a method for reducing the crest factor of an input signal. The method is performed in a part of a transmitter and comprises creating a clipped signal by clipping the input signal using a predetermined clipping threshold and creating a peak signal from the input signal. The peak signal comprises the difference between the input signal and the clipped signal. At least part of the peak signal is convoluted with an inverse Fourier transform of a filtering mask defined in the frequency domain. In this way a filtered signal is created. A subtraction signal is generated by subtracting the filtered signal from the input signal.

18 Claims, 8 Drawing Sheets

METHOD AND APPARATUS FOR CREST FACTOR REDUCTION

CROSS-REFERENCE TO RELATED APPLICATION(S)

This application is based upon and claims the benefit of priority from United Kingdom patent application No. 1002971.8, filed on 22 Feb. 2010; the entire contents of which are incorporated herein by reference.

FIELD

Embodiments described herein relate generally to methods and associated apparatus for reducing the crest factor/peak to average power ratio (PAPR) of a signal that is to be transmitted, for example via a wideband wireless signal having a non-constant envelope.

BACKGROUND

Transmission system transmitting information using signals with a non-constant envelope may encounter signal configurations that have a high crest factor or peak to average power ratio (PAPR). A high crest factor or PAPR negatively affects the efficiency of power amplifiers in the transmitter chain. Current wireless communications systems, for example, favour multicarrier modulation formats due to their high spectral efficiency and robustness in frequency selective channels. One example of a popular multicarrier modulation format is OFDM. The problem of high crest factor or PAPR can be particularly pronounced for multicarrier signals and specifically for OFDM signals. Several crest-factor reduction (CFR) methods exist which try to mitigate this problem.

Figure 1:
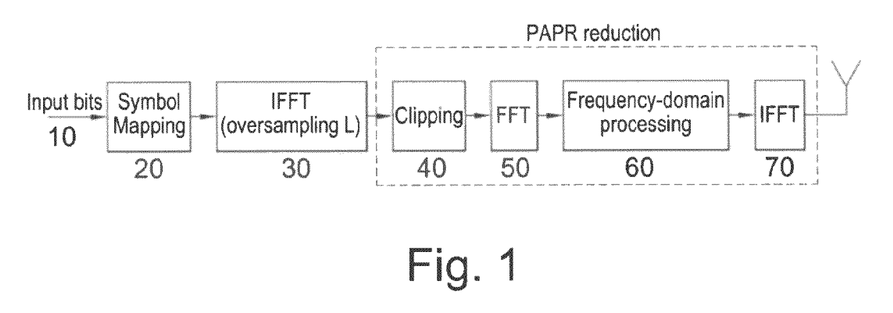
FIG. 1 shows a known OFDM system with clipping-based crest factor reduction.

FIG. 1 shows the block diagram of a typical OFDM transmitter employing crest factor reduction. Initially, input data 10 is mapped to a set of symbols which are allocated to N subcarriers in a bit to symbol mapping unit 20. Thereafter, an IFFT operation 30 provides the time-domain signal to be transmitted. Typically, an oversampled IFFT is used in this step. The oversampling factor is denoted as L. Many Crest Factor Reduction (CFR) methods involve an initial clipping stage by which the input signal amplitude is clipped whenever it crosses a predetermined threshold above the average power. This clipping stage is identified by reference numeral 40 in FIG. 1. The clipping stage 40 directly sets the crest factor of the signal to the desired value. However, it also introduces both in-band and out-of-band noise. The spectral density of this noise depends on the clipping threshold.

Many communications systems have very strict requirements in terms of maximum error vector magnitude (EVM) or adjacent channel leakage ratio (ACLR). To meet these requirements the clipped signal is processed further in known crest factor reduction methods in order to limit the amount of noise introduced by the clipping as well as the EVM and ACLR to acceptable levels.

In the prior art system shown in FIG. 1, the clipped time domain signal is transformed back into the frequency domain using a FFT operation 50. In the frequency domain, out-of-band noise can easily be attenuated and in-band distortion reduced in a frequency domain processing unit 60, to meet the regulatory levels or and/or operator requirements. Thereafter, a conversion back to the time domain is performed via an IFFT operation 70.

Figure 2:
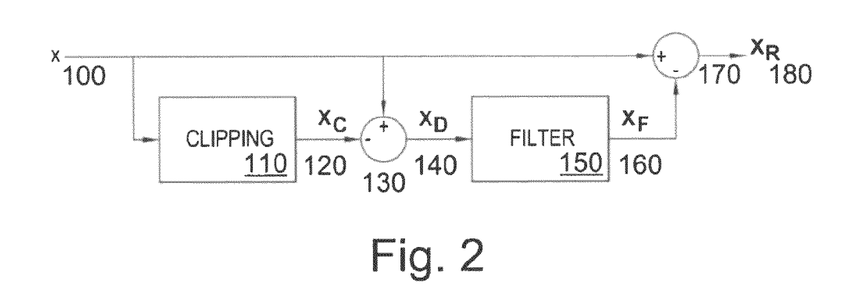
FIG. 2 shows a clipping and filtering architecture for crest factor reduction.

Other methods use a simpler clipping and filtering approach. Such a method is depicted in FIG. 2. In this method an input signal 100 labelled x is clipped in a clipping unit 110 to create a clipped signal 120, labelled $x_c$. This clipped signal 120 is subtracted from the original input signal 100 in a subtractor 130 to form a signal 140, labelled $x_D$), that contains only the above-threshold peaks. The peak signal 140 is then filtered in a filter 150 to attenuate the out-of-band noise, creating a filtered signal 160. The filtered signal 160 is then subtracted from the original input signal 100.

Although this approach is simple, it offers little control over distortion and spectral mask. Moreover, the use of traditional filters may not be practical when transmission takes place over many non-contiguous subcarriers, as is the case in OFDMA mobile terminals. Filtering non-contiguous subcarriers would require many closely-spaced notches in the filter's frequency response. This requirement can increase the order of the filter beyond practical values or requiring multiple filters. A similar problem occurs in base stations if multiple bands, as occur in LTE and WCDMA systems, have to be transmitted simultaneously by the same RF amplifier, so that crest factor reduction has to be performed on the aggregate signal.

BRIEF DESCRIPTION OF THE DRAWINGS

Embodiments will be described in the following by way of example only and with reference to the accompanying drawings, in which.

DETAILED DESCRIPTION

According to one embodiment there is provided a method for reducing the crest factor of an input signal. The method is performed in a part of a transmitter and comprises creating a clipped signal by clipping the input signal using a predetermined clipping threshold and creating a peak signal from the input signal. The peak signal comprises the difference between the input signal and the clipped signal. At least part of the peak signal is convoluted with an inverse Fourier transform of a filtering mask defined in the frequency domain. In this way a filtered signal is created. A subtraction signal is generated by subtracting the filtered signal from the input signal.

The input signal may be a signal with a non-constant envelope, such as an OFDM signal. The transmitter may be an OFDM transmitter. The peak signal may be created by clipping the input signal using a predetermined threshold and subtracting the clipped signal from the input signal to create the peak signal.

As will be discussed in more detail in the example section below the method is able to match or improve on traditional clipping and filtering techniques, while offering a much tighter control over performance variables, such as peak-to-average power ratio (PAPR), error vector magnitude (EVM) and adjacent channel leakage ratio (ACLR). These performance parameters can moreover be dynamically adjusted to varying frequency allocations and performance requirements.

The signal may, following the above described reduction of its crest factor, be amplified using an amplifier and/or transmitted, for example wirelessly via an air interface.

It may not be necessary or desirable to include all of the data points of the peak signal (that is all of the data points above the threshold) in the convolution. Adequate crest factor reduction may be achieved by including only those data values of the peak signal that have the highest magnitude in the convolution/filtering process. The number of peaks included in the convolution may be limited to a predetermined maximum number. The data values in the peak signal may be sorted according to their magnitude so that the predetermined number of peaks with the highest magnitude can be selected.

The inverse Fourier transform of the filtering mask or parts thereof may be generated once and stored in a memory until a replacement mask is generated. The signal that is made subject to crest factor reduction may be a time domain signal that had been transformed from the frequency domain with an inverse Fourier transform performed in a processor. When no signals are to be processed, this processor may be idle and can be used for generating the inverse Fourier transform of the filtering mask. The use of a memory therefore eliminates a need for a more expensive additional processor for performing the inverse Fourier transform of the filtering mask. Several filtering masks may be required for the filtering of different signals and several relevant inverse Fourier transforms of such signals may be stored in the memory. The memory may then be used as a look up table that provides those values of the inverse Fourier transform to the convolution process that are required for the peak signals or for the selected peak signals.

It will be appreciated that the inverse Fourier transforms of several frequency domain filtering masks can be stored in the memory.

To reduce the complexity of the method and the amount of required memory space further the convolution may be limited to use only the largest values of the inverse Fourier transform of the filtering mask, such as for example the largest values of the inverse Fourier transform of the filtering mask that represent a predetermined portion of the total energy of the inverse Fourier transform of the filtering mask. Simulations have shown that acceptable results can be achieved if these largest values of the inverse Fourier transform of the filtering mask represent 80% or more of the total energy of the inverse Fourier transform of the filtering mask. Even better results are achieved if the convolution is limited to use only the largest values that represent 90% of the total energy of the inverse Fourier transform of the filtering mask. If the convolution is limited to use only the largest values that represent 99% of the total energy of the inverse Fourier transform of the filtering mask, results can for practical purpose be the same as if the entire inverse Fourier transform of the filtering mask was used.

Sorting the data values of a peak signal in the above described manner requires that the entire signal that is to be included in the sorting process has to have been received at a crest factor reduction part of a transmitter. Such a signal may, for example, be a signal relating to an OFDM symbol. Having to await receipt of a signal or an entire symbol, however, introduces latency. This problem can be overcome by starting the convolution prior to the receipt of all of the input data points relating to the symbol. In this case an initial peak signal can be created based on those input data points that have already been received. The initial peak signal may contain a number of data points representing non-zero differences between the thus far received input signal and the clipped signal created from it. When further input data points relating to the symbol are received, then further data points can be added to the initial peak signal as they are received to create one or more updated initial peak signals, if the difference between the newly received input data points and the associated clipped signal is non-zero. The convolution may be continued based on the updated initial peak signals. An updating of the initial peak signal can be performed continuously as data points are received until the entire signal relating to the symbol has been received.

If the convolution is limited to using a maximum number of peak signals and if the initial or updated peak signal already comprises a number of data points that corresponds to this maximum number, then a new peak signal data point may replace the one of the previously received peak signal data points with the smallest magnitude in an updated peak signal if the magnitude of the new input signal data point is larger or equal to the magnitude of the previously received peak signal data point with the smallest magnitude.

In a situation where the data points of the inverse Fourier transform of the filtering mask that hold most of the energy of the inverse Fourier transform of the filtering mask are concentrated around and are centred on the origin the convolution can be started without having to await receipt of the entire signal relating to a symbol. Instead the convolution can be started once the number of data points received corresponds to half of the number of the above mentioned data points that hold the majority of the energy of the inverse Fourier transform of the filtering mask. In this situation the convolution uses a large fraction of the energy of the inverse Fourier transform of the filtering mask, despite not awaiting receipt of the entire signal prior to commencing the convolution. The method can therefore be adapted so that any error that may be introduced by initially convoluting only part of the input signal is negligible. This can be done by awaiting receipt of a first number of input data points until the amount of energy contained in twice the first number of data points centred around the origin of the inverse Fourier transform of the filtering mask is reasonably high to avoid unacceptable errors.

One potential source of error is that the selection of the predetermined number of those peaks that have the highest magnitude can only be completed once the entire signal has been received. From this fact it will be appreciated that in arrangements where computing the convolution is commenced before the entire symbol has been received, it is possible, or even likely, that some of the peaks that have initially been selected to form part of a set of peaks comprising the predetermined number of peaks that have the highest magnitude have to be excluded from this set and instead replaced by newly received peaks that have a higher magnitude. This replacement would take place while the convolution is being computed. Commencing the convolution after the first number of input data points has been received may thus inadvertently omit a multiplication of a part of the inverse Fourier transform of the filtering mask with a peak that has not yet been received/that is not within the first number of input data points. The part of the inverse Fourier transform with which any such peak would be multiplied is, however, not close to the origin of the inverse Fourier transform, as, at the beginning of the convolution, the values at the centre of the inverse Fourier transform are multiplied with the initially selected peaks out of the first number of input data points. If the largest part of the energy of the inverse Fourier transform is concentrated around the origin, then the values of the inverse Fourier transform that are further away from the origin are likely to be small. Consequently an omission of a multiplication with any such values is unlikely to introduce an appreciable error.

In practice, the amount of energy that needs to be contained within the above referred to twice the first number of data points (for a symmetric inverse Fourier transform) may be 80%, more advantageously 90% and even more advantageously 99%. Simulations have shown that in an inverse Fourier transform of a filtering mask of 1024 data point 80% of the energy can in practice be contained in 4 data points centred on the origin of the inverse Fourier transform of a filtering mask, 90% of the energy in 8 data points centred on the origin of the inverse Fourier transform of a filtering mask and 99% of the energy in 10 data points centred on the origin of the inverse Fourier transform of a filtering mask. From this it will be appreciated latency can be reduced significantly, as computing the convolution can be commenced considerably earlier than would be possible if receipt of the entire signal had to be awaited. It will be appreciated from the above discussion that the magnitude of the error that is introduced by starting computing the convolution before the entire signal that is to be included in the peak sorting process is received depends on the magnitude of the values of the negative part of the inverse Fourier transform that are spaced apart from the origin of the inverse Fourier transform of the filtering mask by a number of data points that is greater than the first number of input data points. The magnitude of these outlying values can be considered sufficiently small to not introduce appreciable error if the fraction of the energy contained in the negative part of the inverse Fourier transform that is spaced apart from the origin by a number of data points that exceeds the first number of input data points is less than 20%, less than 10% or less than 1% of the total energy of the negative part of the inverse Fourier transform.

It will be appreciated that the entire inverse Fourier transform of the filtering mask is used for the convolution once the entire signal has been received, even if the convolution is started before the entire signal has been received. In a further simplification of the above described method, those parts of the inverse Fourier transform of the filtering mask that lie outside of the window that comprises the 80%, 90% or even 99% of the total energy may be set to zero.

Once the convolution has been started and further input data values are received, the newly received data values can be added to the input signal that is made subject to the convolution.

As mentioned above, the predetermined number of peaks that is made subject to the convolution may be chosen to match available hardware. The convolution may, for example require the presence of a multiplier for each peak signal data value. Because the method focuses on the filtering of peak signals, the number of complex multipliers used in embodiments is already limited. The method is moreover suitable for implementation in software radio systems. By limiting the number of peak signal data values that are used in the convolution, the hardware requirements of the convolution can be further reduced and, if required, matched to already available hardware. Choosing the number of peak signal values that should form part of the convolution can, however, be based on or be influenced by other considerations. It is, for example, known that crest factor reduction methods distort the transmitted signal. Often such distortion is expressed in terms of error vector magnitude and it is desirable to keep the error vector magnitude within defined bounds to ensure that the transmitted signal can be correctly identified by a receiver. It has been realized that for OFDM signals the error vector magnitude increases with increasing number of peaks used in the convolution (and consequently with increasing number of peaks filtered by the convolution and then subtracted from the original signal). The number of peaks that are to be used in the convolution may thus be chosen such that the error vector magnitude is below a predetermined maximum threshold. The error vector magnitude of the subtraction signal may for this purpose be determined and, if the error vector magnitude exceeds a maximum acceptable error vector magnitude, the data point of the peak signal that has the smallest magnitude of the data points of the peak signal may be set to zero. The error vector magnitude of a subtraction signal created based on such a reduced peak signal may be repeatedly determined in this manner, each time setting the smallest remaining peak signal value to zero until the determined error vector magnitude is deemed to be below the required maximum threshold/value. The error vector magnitude may be determined using a known expression for determining the error vector magnitude. The known equation can thus be used to predict the error vector magnitude, depending on the number of peaks remaining in the peak signal. For OFDM signals, for example, the error vector magnitude conforms to the following inequality:

$$(EVM)^2 \leq \frac{1}{N} \frac{P \sum_{k \in \Omega} |g[k]|^2 \sum_{j \in T^P} |x_D[j]|^2}{|S_{REF}|^2}$$

wherein EVM is the error vector magnitude, N is the number of subcarriers of the signal, P is the number of (remaining) non-zero time indeces in the peak signal, g is the inverse Fourier transform of the filtering mask, $\Omega$ are the indeces of the frequency domain signal, $T^P$ are the time indices of the non-zero data values of the peak signal, $x_D$ is the peak signal and $S_{REF}$ is a reference symbol. Consequently, the number of non-zero values in peak signal $x_D$ can be reduced in the above described manner until the following inequality holds:

$$\sum_{j \in T^P} |x_D[j]|^2 \leq \frac{N(EVM)^2 |S_{REF}|^2}{P \sum_{k \in \Omega} |g[k]|^2}$$

The above description is limited to embodiments that perform a convolution in the time domain using the inverse Fourier transform of a frequency domain filtering mask. Given that the peak signal that is filtered in this manner is sparse, the peak signal can also be transformed into the frequency domain and filtered directly using the filtering mask before being transformed back to the time domain to create the subtraction signal. While doing so may require a Fourier and an inverse Fourier transform, the sparse nature ensures that these transformations remain computationally inexpensive. This embodiment thus differs from the known arrangement shown in FIG. 1, as the FIG. 1 arrangement calculates a Fourier transform of the non-sparse clipped signal.

According to another embodiment there is thus provided a method for reducing the crest factor of a time domain signal. The method is performed in a transmitter and comprises creating a clipped signal by clipping the signal using a predetermined clipping threshold, subtracting the clipped signal from the signal to create a peak signal, generating a filtered peak signal by transforming at least a part of the peak signal into the frequency domain, creating a filtered signal by applying a frequency domain filtering mask to the transformed peak signal and transforming the filtered signal into the time domain. The transformed filtered signal is then subtracted from the input signal. The transformation of the peak signal into the frequency domain may be a Fourier transformation. The transformation of the filtered peak signal into the time domain may be an inverse Fourier transform.

Irrespective of whether the filtering is performed in the time domain by convolution or in the frequency domain, the non-zero values of the peak signal may, prior to filtering, be multiplied by complex weighing factors to reduce or eliminate peak re-growth.

According to another embodiment there is provided an apparatus comprising an input for receiving a time domain input signal, a processor arranged to create a clipped signal by clipping the input signal using a predetermined clipping threshold, to create a peak signal that comprises a difference between the input signal and the clipped signal, to convolute at least a part of the peak signal with the inverse Fourier transform of a filtering mask defined in the frequency domain to create a filtered signal, and to create a subtraction signal by subtracting the filtered signal from the input signal.

The apparatus may form part of a transmitter. The apparatus may be connected to an RF front end of a data transmission system, such as an OFDMA system or a CDMA system, so that the output signals of the apparatus form the input signal of the amplifier. The apparatus may be useful in any transmission system in which signals with a non-constant envelope are likely to be transmitted, such as multicarrier systems.

The processor may comprise a number of multipliers. The processor may further be arranged to input one peak signal value and one value of the inverse Fourier transform of the filter mask to each multiplier for multiplication. Input ports of an adding circuit may be connected to the respective outputs of the multiplying circuits, so that the multiplication results provided by the multipliers can be added.

A memory storing at least part of the inverse Fourier transform of the filtering mask may be provided. The memory may provide a look up table function. The apparatus may be arranged to input time indexes of the values of the peak signal input to the multipliers to the memory. The memory may be arranged to use the time indices as addresses and to output values of the inverse Fourier transform of the filtering mask based on these addresses.

The apparatus may further comprising an IFFT processor that is arranged to perform an inverse Fourier transform of a signal to create the input signal. The IFFT processor may further be arranged to calculate the inverse Fourier transform of the filtering mask during an idle period and to store the inverse Fourier transform of the filtering mask in the memory.

The apparatus may further comprise a peak sorting arrangement that is arranged to sort the peaks of the input signal in the order of their magnitude and to select a predetermined number of peaks for convolution. The number of peaks used in the convolution can thereby be limited to a maximum number and the sparseness of the peak signal can thus be ensured. The number of peaks used can correspond to number of multipliers provided in the apparatus.

Instead of relying on a peak sorting means, the apparatus may be arranged to convolute the peak signal in real time, starting after a predetermined number of peak signal values relating to a single OFDM symbol have become available for convolution/have been received. This has the advantage that it is not necessary to await receipt of all of the signals relating to a particular symbol before the received signal can be processed.

The processor may further be arranged to determine whether the error vector magnitude of the subtraction signal is above a predetermined threshold or to predict whether the error vector magnitude of the subtraction signal is likely to be above the predetermined threshold and to set the smallest data value of the peak signal that has been used or that would be used in creating the subtraction signal to zero prior to the convoluting. This determination or prediction method can be repeated until the error vector magnitude to the subtraction signal is determined or predicted to be less than a predetermined maximum acceptable threshold value, each time setting the smallest remaining non-zero peak signal value to zero.

According to another embodiment there is provided an apparatus for reducing the crest factor of a time domain signal. The apparatus comprises a signal input for receiving the time domain signal and a processor. The processor is arranged to create a clipped signal by clipping the signal using a predetermined clipping threshold, to create a peak signal that comprises the difference between the input signal and the clipped signal, to transform the at least a part of the peak signal into the frequency domain, to create a filtered signal by applying a frequency domain filtering mask to the transformed peak signal, to transform the filtered signal into the time domain and to subtract the transformed filtered signal from the signal.

An embodiment combines the approaches shown in FIGS. 1 and 2. The embodiment in particular adopts the clipping and filtering architecture shown in FIG. 2 but replaces the traditional filter by a conversion of the peak signal into the frequency domain or by convoluting the signal in the time domain using the inverse Fourier transform of a filtering mask defined in the frequency domain. The architecture shown in FIG. 2 thus also applies to embodiments. However, embodiments use a filtering technique that is different from known filtering techniques, as discussed in more detail below. In the frequency domain out-of-band interference can be attenuated more easily than in the time domain. The processed frequency domain signal is then converted back to time domain for transmission. The main advantage compared to the known crest factor reduction technique discussed above with reference to FIG. 1 is that the conversion from the time domain into the frequency domain is now performed on a signal that contains only above-threshold peaks. Signals of this nature are typically sparse, unless the chosen clipping threshold level is very low.

As discussed in more detail below, the sparse nature of the peak signals that are to be filtered allows the filtering to be performed without having to perform any explicit FFT and IFFT operations. The method of the embodiment thus reduces the complexity associated with the crest factor reduction method greatly when compared to the known method of FIG. 1. When compared to the known method of FIG. 2, the method of the embodiment moreover provides a simplified way of filtering the peak signal without any need for complex filters.

Referring again to FIG. 2, a signal $x_C$ results from clipping the input symbol x of length NL. Polar clipping is employed whereby the value for every element $x_j$ of x whose absolute value exceeds certain threshold C is replaced by:

$$\hat{x}_j = C \exp(j \angle x_j) \qquad (1)$$

where $\angle x_j$ denotes the phase of $x_j$. Thereafter, a signal containing only the above-threshold peaks $x_D$ is calculated by subtracting $x_C$ from x. Due to the hard clipping, this peak signal is likely to have spectral content out of the main band of interest, and therefore has to be filtered. Typical clipping and filtering implementations employ conventional digital filter architectures such as FIR filters. However, it is difficult to create a complex frequency response with many notches and peaks, as would be required by some OFDMA signals, for example.

In the method of the present embodiment, the conventional filter is replaced by an alternative arrangement which performs an FFT operation on $x_D$. A desired frequency domain filtering mask $G(\Omega)$ is then applied to the frequency-domain values, wherein $\Omega$ are the indices of the frequency domain signal. The mask $G(\Omega)$ is chosen so that the signal in out-of-band positions $\Omega_o$ are attenuated by an amount required to meet the required maximum error vector magnitude (EVM) or adjacent channel leakage ratio (ACLR). The mask $G(\Omega)$ is moreover chosen so that values in the in-band frequencies $\Omega_I$ remain unmodified. Once the mask $G(\Omega)$ has been applied to the frequency-domain signals the filtered signal is converted back to the time domain via an IFFT operation. This method can be expressed in mathematical form by:

$$x_F[i] = \frac{1}{N} \sum_{j \in T} x_D[j] \sum_{k \in \Omega} G[k] \exp\left(-j\frac{2\pi}{NL}(i-i)k\right) \quad (2)$$

wherein $x_F$ is the filtered peak signal, N is the number of sub-carriers to which the signal is allocated, T are the time indices of the time domain signal, $x_D$ is the time domain signal comprising only the clipped peak values, $\Omega$ are the indices of the frequency domain signal, G is the frequency domain filtering mask, as discussed above and L is the over-sampling factor used in the initial inverse Fourier transformation that was used to transform the frequency domain signal comprising the mapped symbols into the time domain (as per FIG. 1).

Equation (2) can also be expressed as $$x_F[i] = \frac{1}{N} \sum_{j \in T} x_D[j] g[i-j] \quad (3)$$

where g(T) is the inverse discrete Fourier transform of $G(\Omega)$.

As mentioned above, in most cases the signal $x_D$, is sparse and only a small subset of the time indexes T of signal $x_D$ contains non-zero values.

In a embodiment the number of non-zero positions within $x_D$ that are included in the filtering process is limited to a maximum number $P_m$. Consequently, in an initial step of the method, the peaks in the time domain signal $x_D$, are sorted by their magnitude and a set $T^P$ of P time indexes where $x_D$, is non-zero is selected. If the number P of non-zero peaks in the signal $x_D$ is larger than $P_m$, then the $P_m$ peaks with the largest magnitude are selected. The maximum value for P is thus $P_m$. Limiting the number of peaks to a predetermined maximum number is advantageous as it reduces the complexity of the method and as the predetermined maximum number can be matched to hardware availability in the transmitter, as discussed in more detail below.

The above described FFT and IFFT operations are then performed. In doing so only the indexes of $T^P$ are considered. This can be expressed in the following form:

$$x_F[i] = \frac{1}{N} \sum_{j \in T^P} x_D[j] g[i-j] \quad (4)$$

or in matrix form as:

$$x_F = A x_D^P \quad (5)$$

where A is a (NL)×P matrix with entries given by:

$$a_{ij} = g[i-T^P(j)] \quad (6)$$

where $x_D^P$ is a vector containing the above discussed sorted peaks.

Figure 3:
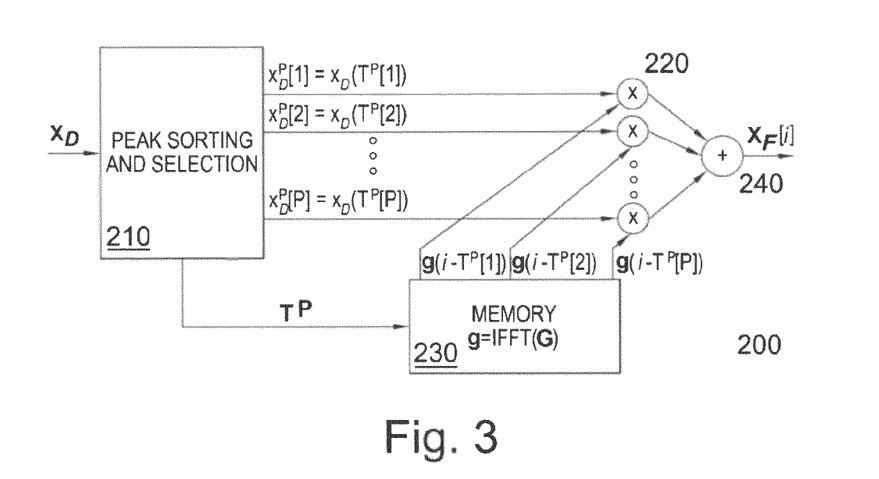
FIG. 3 shows an example filter architecture.

FIG. 3 shows a filter 200 of applying the processing of equation (4) in a transmitter. The FIG. 3 filter 200 in one embodiment takes the place of the filter 150 in FIG. 2. As can be seen from FIG. 3, a peak sorting and selecting means 210 sorts the P peaks in the time domain peak signal $x_D$. The P sorted signals $x_D^P[1]$ to $x_D^P[P]$ thus represent the sorted peaks of the signal $x_D$, or, if the number of peaks in the signal $x_D$ was higher than the maximum number of peaks $P_m$, the $P_m$ largest peaks of the signal $x_D$. The P sorted signals $x_D^P[1]$ to $x_D^P[P]$ form one respective input to P associated multipliers 220.

The peak sorting and selecting means 210 further identifies the time indexes $T^P$ of the selected peaks to the memory 230. The memory 230 acts as a look up table and comprises a pre-computed set of time domain values g(T) of a desired attenuation mask $G(\Omega)$ that had previously been defined in the frequency domain.

It should be noted that the desired spectral mask does not typically change on a symbol-by-symbol basis but much more slowly, and it does not change during transmission of a symbol. In the case of OFDM systems it is as a consequence possible to implement the method of the embodiment without additional FFT processors, as a single processor can be reused for both time-domain signal generation and for pre-computing the values of g(T) at times where no time domain signals need to be computed. It is alternatively possible, given that generally only a limited set of spectral masks can be selected, to pre-compute the desired IFFT values for all of the required spectral masks and store them in the memory 230. It is also possible to reduce the required memory size by storing only a subset of the biggest values of g(T) in absolute-value terms and treating the remaining values of g(T) as zeros. Provided most of the energy of g(T) is included in the selected indices, the filtering characteristics stay within acceptable values. Storing the inverse Fourier transform of the filtering mask eliminates the need to calculate the inverse Fourier transform of the filtering mask at times when the crest factor of an input signal has to be determined.

The memory 230 uses the indices $T^P$ as addresses. P values $g(i-T^P[1])$ to $g(i-T^P[P])$ of the inverse Fourier transform of the frequency domain filtering mask $G(\Omega)$ are output based on these addresses. The values $g(i-T^P[1])$ to $g(i-T^P[P])$ form a further input to the multipliers 220, so that the multipliers 220 perform the multiplication of the selected peak values and the Fourier transform of the frequency domain filtering mask required by equation (4). An adder 240 is also provided to sum the P multiplication results in conformity with equation (4). It will be appreciated that the inverse Fourier transforms of several frequency domain filtering masks can be stored in the memory. This makes the above described method highly reconfigurable, as new/altered filtering masks can be defined when required/desired, subjected to an inverse Fourier transform and stored. Alternatively, the frequency domain filtering mask or masks can of course be stored prior to the inverse Fourier transformation.

In a further embodiment, if the latency incurred by the above described peak sorting step is unacceptable it is possible to limit the filtering technique to those peaks that are, at a particular time instance, in a time window extending from index 1 of the input symbol up to a minimum number of indexes i+B. This can expressed as:

$$x_F[i] = \frac{1}{N} \sum_{j \in T^P_{i+B}} x_D[j]g[i-j] \quad (7)$$

where $T^P_{i+B}$ is the sorted list of peak indexes obtained by only considering the initial i+B samples of the input symbol. If most of the energy of g(T) is concentrated in window with 2B values around the origin, as is the case for many low-pass filter masks, the filter characteristics achieved by equation (7) are substantially the same as those achieved by equation (4).

It has moreover been realised that the EVM introduced by the crest factor reduction method is proportional to the number of indices of $T^P$. If an expression which relates EVM to the number of peaks is available, it is possible to impose upper bounds on EVM by eliminating indices of $T^P$ until a desired EVM condition is satisfied by predicting EVM using the known expression. In this case there is thus no need to apply the crest factor reduction method several times until the desired EVM is achieved. The following consideration applies this recognition to the case of OFDM. For OFDM the root mean square of the EVM can be expressed as:

$$EVM = \sqrt{\frac{1}{N} \frac{\sum_{j \in \Omega_i} |s_j - s_{jR}|^2}{|s_{REF}|^2}} \quad (8)$$

where $s_j$ is the transmit OFDM frequency domain symbol at subcarrier j and $s_{jR}$ is the same symbol after CFR, so that $|s_j - s_{jR}|$ denotes the error introduced for the symbol at subcarrier j. $s_{REF}$ relates to the constellation point with the highest energy, which serves as a reference symbol. It can be shown that the following inequality holds:

$$(EVM)^2 \leq \frac{1}{N} \frac{P \sum_{k \in \Omega} |g[k]|^2 \sum_{j \in T^P} |x_D[j]|^2}{|s_{REF}|^2} \quad (9)$$

Figure 4:
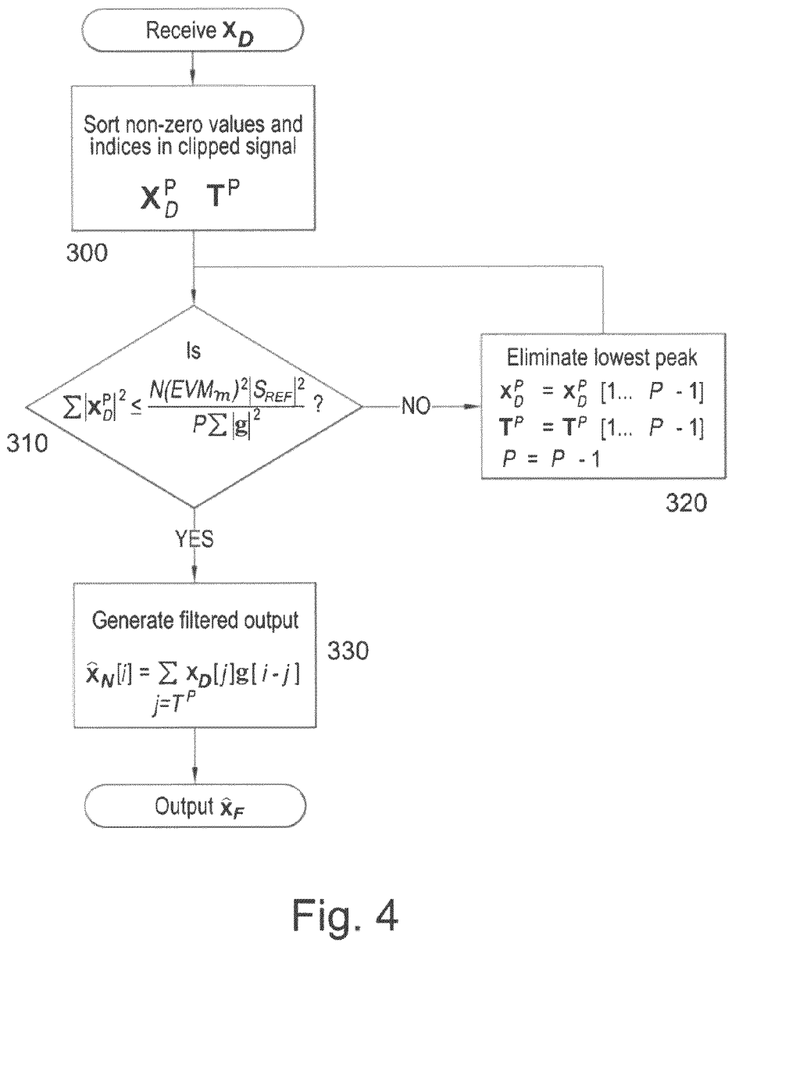
FIG. 4 shows a method for imposing an EVM upper bound onto clipped OFDM signals.

It is possible to ensure, based on this inequality, that no symbol exceeds a maximum tolerable EVM value. A method of limiting EVM in this manner is illustrated in FIG. 4. In conformity with the above description in a first step 300 the peaks that are to be clipped are selected. Based on inequality (9) it is then determined in step 310 whether or not the selected peaks create an EVM that is above an acceptable level $EVM_m$. Should the EVM associated with the selected peaks be larger than the acceptable level $EVM_m$, then the peak with the smallest magnitude is removed from the set of peaks that are to be considered during filtering in step 320. Steps 310 and 320 are repeated until the EVM associated with the remaining selected peaks is below the $EVM_m$. The remaining selected peaks are then made subject to one of the above described filtering operations in step 330.

From FIG. 4 it will be appreciated that, in order to fulfil the EVM requirement, it is not necessary to calculate the filtered output. Instead EVM can be predicted based solely on the properties of the selected peaks. Some known methods of predicting EVM in contrast require that the filtered signal is generated first and that EVM is then determined from the filtered signal. It will be appreciated that, should the determined EVM exceed a maximum tolerable amount, the filtered signal has to be re-determined as often as is required for reducing EVM below the maximum tolerable amount. This can be computationally expensive. This expense is avoided by the method shown in FIG. 4.

It is well known that any filtering applied to the peak signal in order to meet spectral mask requirements will invariably result in peak re-growth. Filtering clipped peak signals therefore generates a resulting signal that has a higher crest-factor than a signal that has been clipped but not filtered. An optional method for reducing peak re-growth in the above proposed algorithm is discussed in the following.

In the method a set of complex weights b is applied to the selected peaks $x_D$. In matrix form this can be expressed in the form:

$$x_F = ABx_D^P \quad (10)$$

where B is a P×P diagonal matrix containing the aforementioned weights on its main diagonal. These weights are designed to eliminate peak re-growth at positions $T^P$. This means that the equality $x_F = x_D$, should hold at positions $T_P$. The set of weights that achieves this can be obtained by solving the linear system of equations $A^P \times b = 1^P$ where $1^P$ is a column vector of length P with all elements equal to 1.

Applying the complex weights b reduced crest-factor. However, compared with the above described method that does not use these complex weights and when the same threshold is used, the use of the complex weights b increases EVM. However, if a higher threshold is for the weighed crest factor reduction method, the weighed crest factor reduction method produces similar results in terms of crest factor and maximum EVM, when compared to the above described unweighted crest factor reduction method, but yields a reduced average EVM thanks to the higher threshold. Moreover, a higher threshold potentially reduces the required $P_m$. The hardware requirements associated with the weighted crest-factor reduction method are thus lowered. A higher threshold also reduces the number of symbols requiring crest-factor reduction in the first place. This saves energy.

The embodiment is less complex than some known the methods. When compared to traditional clipping and filtering methods, such as the method discussed above with reference to FIG. 2, the embodiment provides the advantage that the filtering mask defined in the frequency domain can be arbitrary. The method of the embodiment is therefore suitable for use in a filter for systems where the total spectrum assigned to users contains many non-contiguous groups of sub-carriers and where accordingly complex filtering masks are required in order to limit the amount of interference introduced in other users' spectra when clipping a transmit signal, and in particular for use in mobile terminals within such systems. Examples of such systems are OFDMA systems, such as an LTE system or a WiMAX system, or other multiband transmitters with complex transmit signal spectral content. The embodiment is, however, more generally of use in reducing the crest factors of signals with changing transmission envelope. The embodiment may moreover find use in base stations requiring very efficient power amplifiers and high reconfigurability, e.g. femtocell base stations. The embodiment moreover does not require any modification to the receiver, or any transmission of overhead information to the receiver.

EXAMPLES

Figure 5:
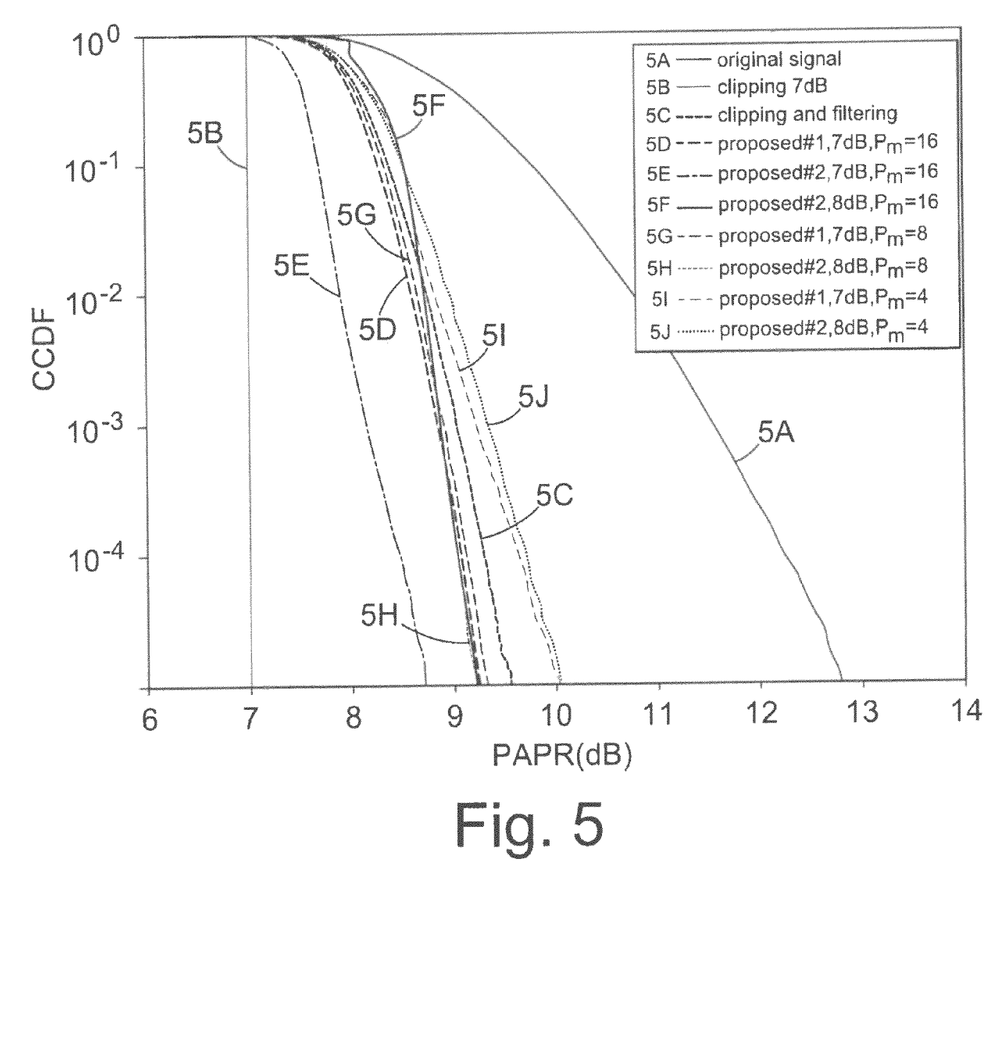
FIG. 5 compares cumulative distribution function of clipped symbols' crest factors.
Figure 6:
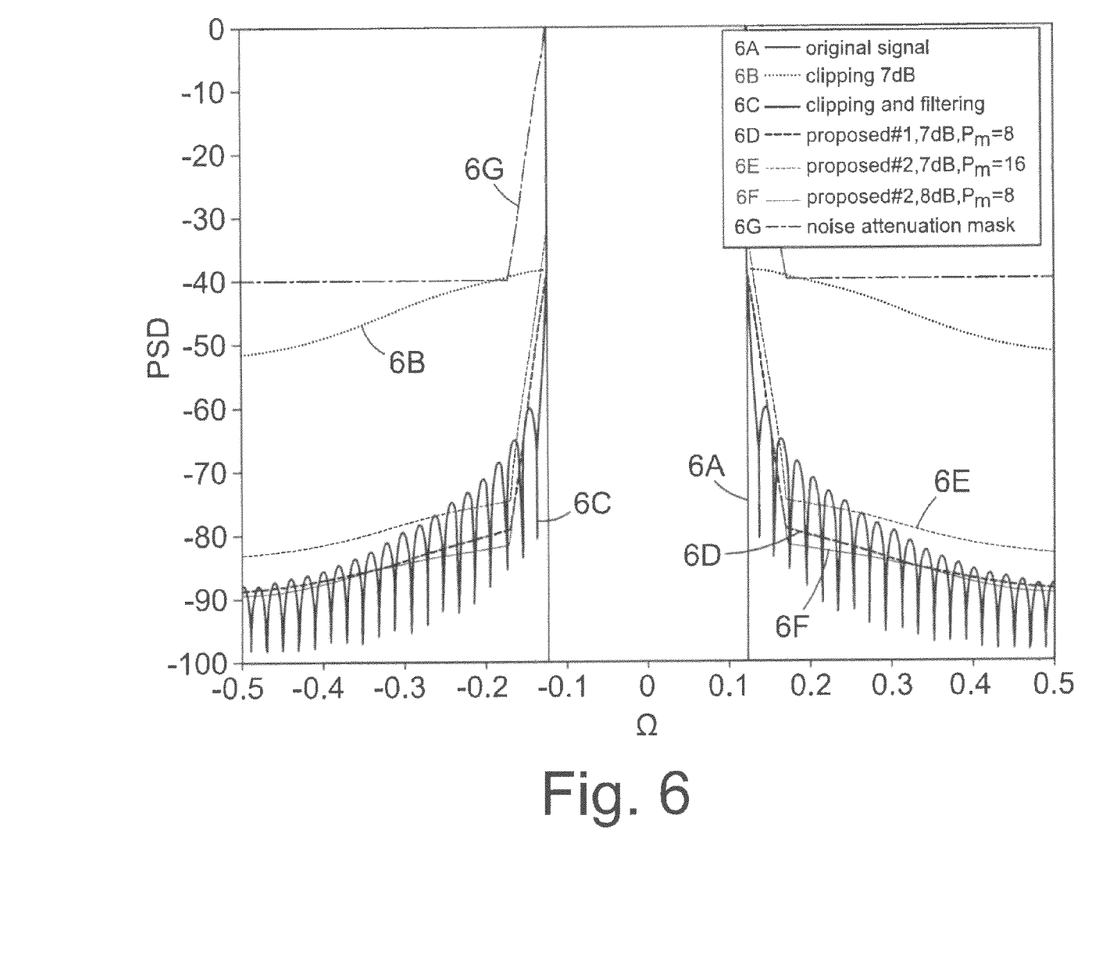
FIG. 6 compares the spectral densities of the average output power of the clipped symbols, plotted over frequency.
Figure 7:
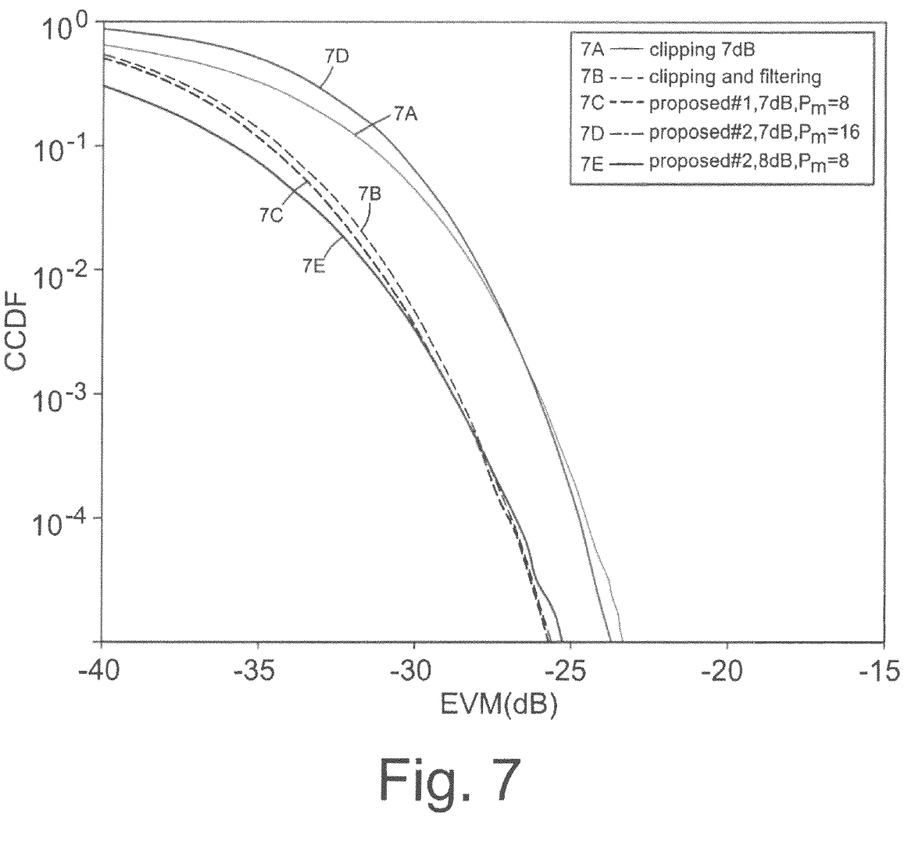
FIG. 7 compares cumulative distribution function of clipped symbols' EVM.

FIGS. 5, 6 and 7 show crest factor reduction results for an OFDM systems with N=512 subcarriers and oversampling of L=4. FIG. 5 shows the CCDF for the resulting OFDM symbols' crest-factor, FIG. 6 shows the average output power spectral density and FIG. 7 shows the CCDF for the symbols' EVM. Results for conventional clipping and filtering are shown along with results for the proposed methods using different values of $P_m$ and clipping threshold set at 7 dB for the original method (i.e. the method that does not apply weighting) and 8 dB for the modified/weighted version. The clipping and filtering curve was obtained for an order 50 raised cosine FIR filter with roll-off factor 0.05. It can be seen from FIGS. 5 to 7 that a very low value of $P_m$=8 reduced PAPR better than clipping and filtering, while eliminating out of band ripple created by clipping and filtering and providing a reduction in EVM.

FIG. 5 also shows that the modified/weighted method reduces PAPR compared to the original method when they both use the same clipping threshold of 7 dB. However, the EVM of the modified method is higher than that of the original method. Increasing the clipping threshold of the modified method to 8 dB, reduces the maximum EVM, so that it becomes approximately the same as that of the original method using 7 dB, while providing PAPRs similar to that provided by the original method. The higher clipping threshold moreover means that the percentage of symbols requiring CFR is reduced by 10%. The average EVM is moreover improved by approximately 3 dB. Bigger improvements are obtained for higher clipping thresholds.

Figure 8:
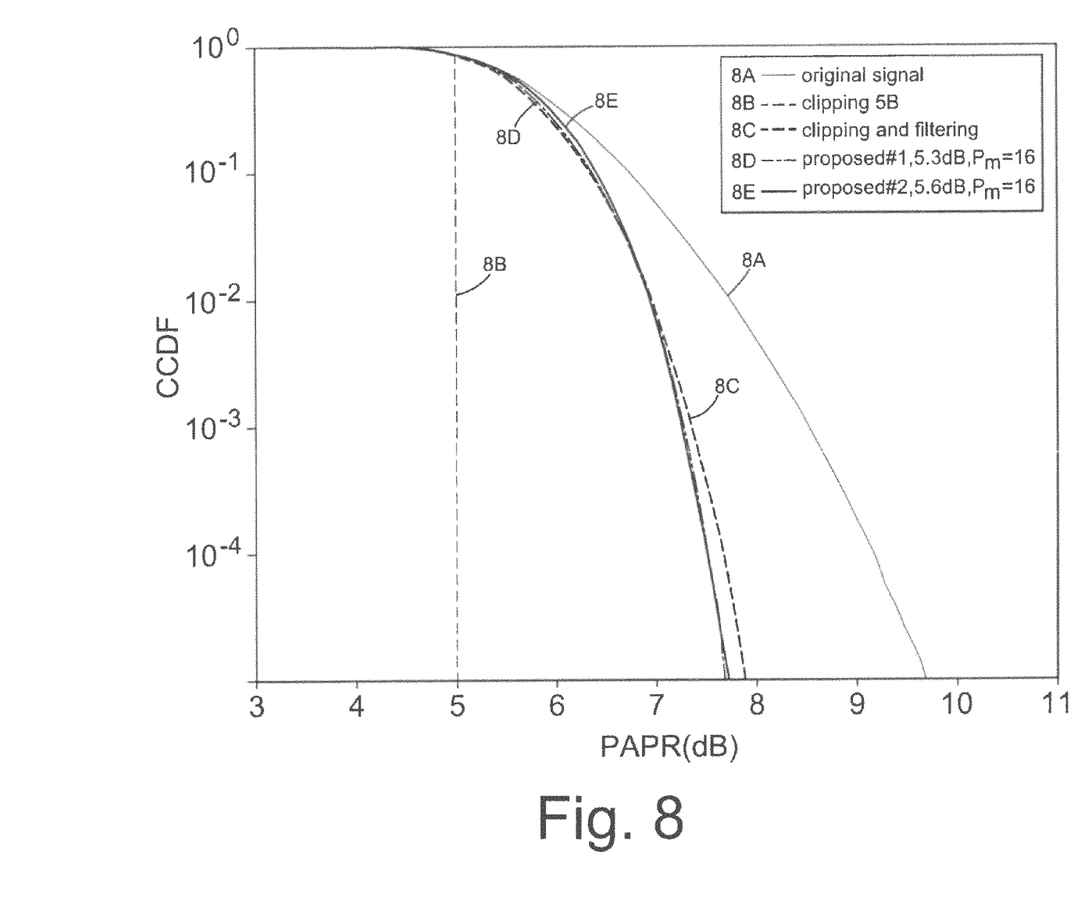
FIG. 8 compares cumulative distribution function of clipped symbols' crest factors for a discontinuous signal.
Figure 9:
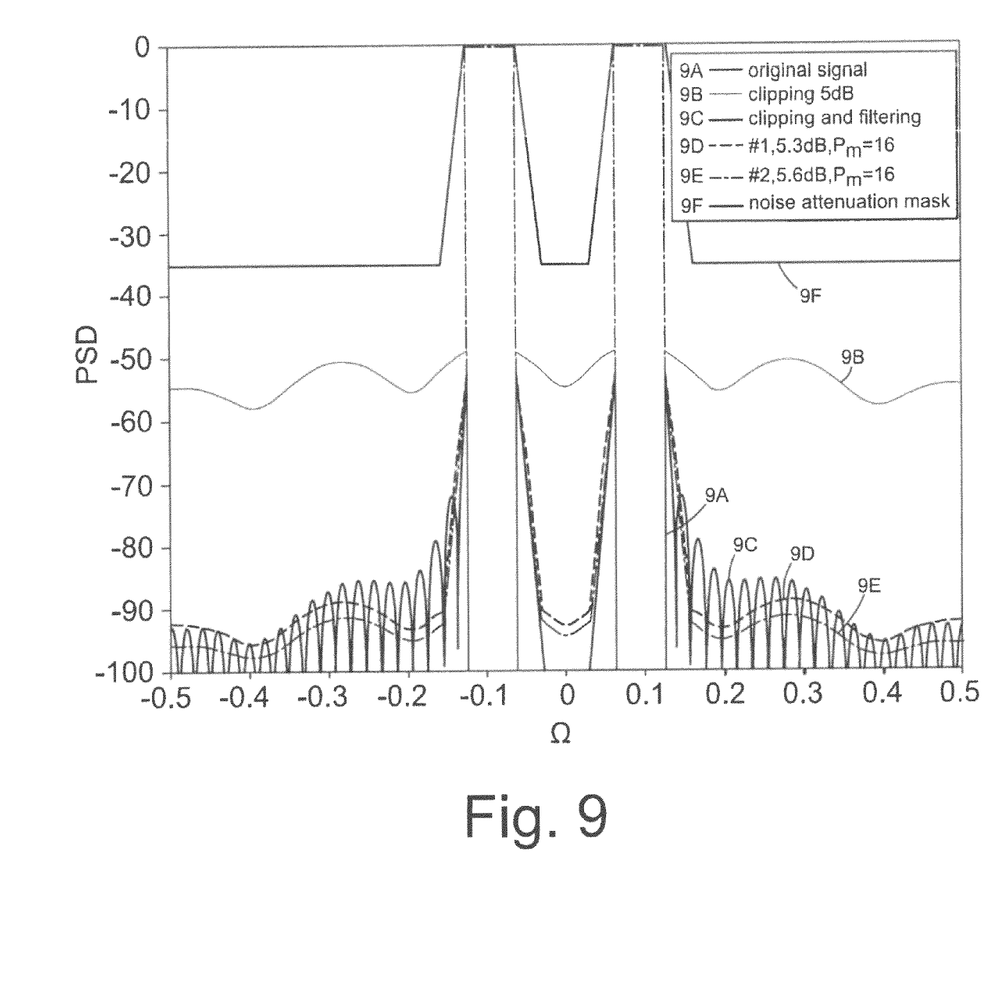
FIG. 9 compares the spectral densities of the average output power of the clipped symbols, plotted over frequency for a discontinuous signal.
Figure 10:
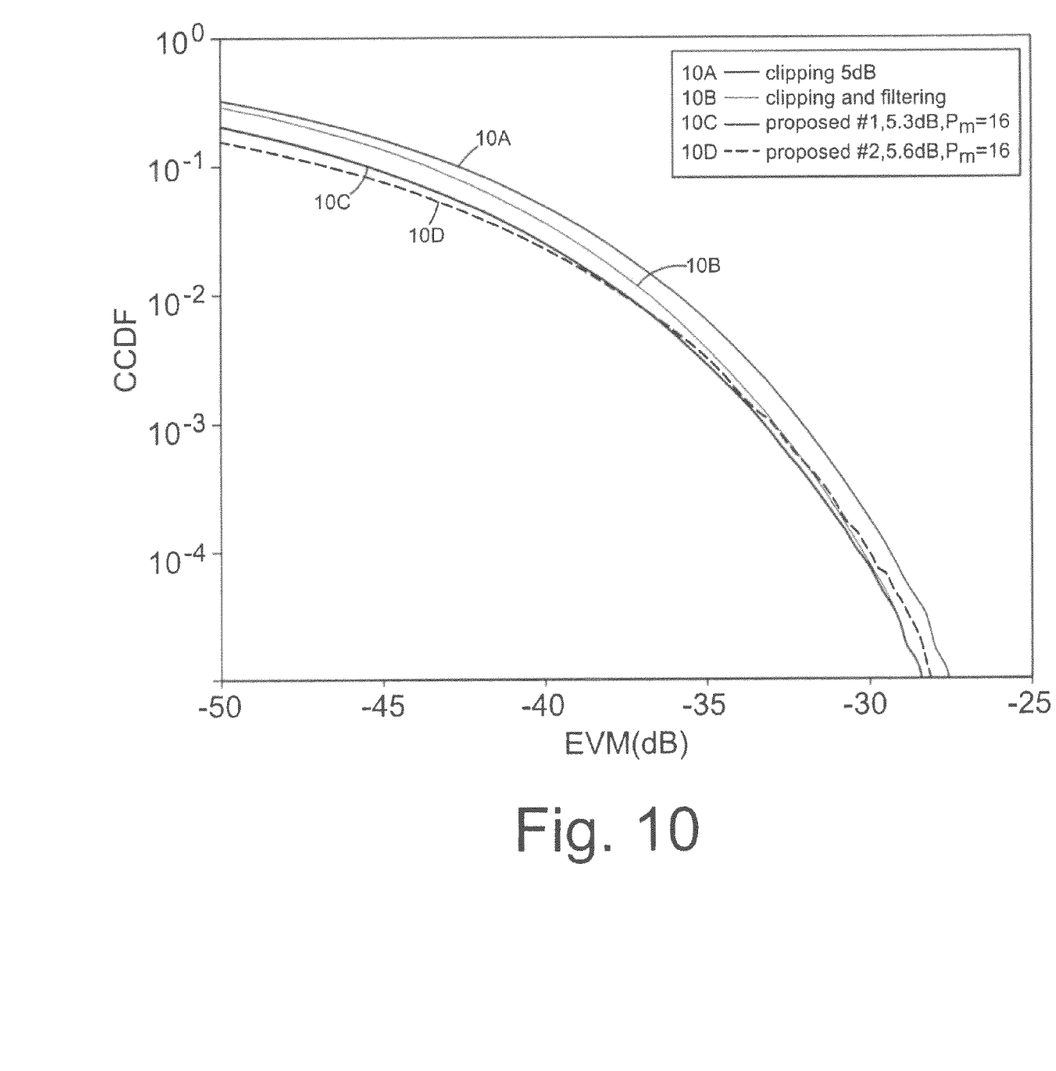
FIG. 10 compares cumulative distribution function of clipped symbols' EVM for a discontinuous signal.

FIGS. 8, 9 and 10 show results for a signal with a gap in the middle of the spectrum. FIG. 8 shows the CCDF for the resulting OFDM symbols' crest-factor, FIG. 9 shows the average output power spectral density and FIG. 10 shows the CCDF for the symbols' EVM. The results shown in FIGS. 8 to 10 are similar to those shown in FIGS. 5 to 7. Noise reduction both outside and within the gap require two filters (one high pass one low pass) if clipping and filtering is used. The proposed method does not require any additional hardware.

While certain embodiments have been described, these embodiments have been presented by way of example only, and are not intended to limit the scope of the invention. Indeed, the novel methods and apparatus described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method for reducing the crest factor of an input signal related to a symbol, the method performed in a part of a transmitter and comprising:
    creating a clipped signal by clipping the input signal using a predetermined clipping threshold;
    subtracting the clipped signal from the input signal to create a peak signal;
    selecting only a predetermined number of data points of the peak signal, wherein the predetermined number of data points are the predetermined number of data points of the peak signal with the highest magnitudes;
    convoluting the selected data points of the peak signal with the inverse Fourier transform of a filtering mask defined in the frequency domain to create a filtered signal; and
    creating a subtraction signal by subtracting the filtered signal from the input signal;
    wherein an initial peak signal is created prior to receipt of all data points of the input signal relating to the symbol and wherein said convolution is started based on the initial peak signal; and
    wherein further data points are added to the initial peak signal as the further data points are received as part of the input signal relating to the said symbol, thereby creating an updated initial peak signal and wherein said convolution is continued based on the updated initial peak signal.

2. A method according to claim 1, wherein the inverse Fourier transform of the filtering mask is generated once and stored in a memory.

3. A method according to claim 1, further comprising computing the inverse Fourier transform of the filtering mask using a processor of the transmitter, wherein the processor is also adapted to generate the input signal by computing the inverse Fourier transform of signals that are to be transmitted by the transmitter.

4. A method according to claim 1, wherein only the largest values of the inverse Fourier transform of the filtering mask representing at least 80%, at least 90% or at least 99% of the energy of the inverse Fourier transform of the filtering mask are used in convoluting the at least a part of the peak signal.

5. A method according to claim 1, wherein at least 80%, at least 90% or at least 99% of the energy of the inverse Fourier transform of the filtering mask is concentrated within a first number of data points of the inverse Fourier transform of the filtering mask, centred on the origin of the inverse Fourier transform of the filtering mask; and
    wherein the input signal is a part of the inverse Fourier transform of a symbol of an OFDM signal extending from a first data point of the inverse Fourier transform and comprising at least half of the first number of data points.

6. A method according to claim 5, wherein the method is consecutively applied to a plurality of input signals, the plurality of input signals relating to the same symbol of an OFDM signal, wherein a first input signal of the plurality of input signals is part of the inverse Fourier transform of the symbol, the part comprising at least a number of data points that is equal to half of the first number of data points, the first data point of the part being the first data point of the inverse Fourier transform; and
    wherein subsequent input signals are generated by receiving further parts of the inverse Fourier transform of the symbol and appending the received further parts to a previous input signal.

7. A method according to claim 1, further comprising determining the error vector magnitude of the subtraction signal and, if the error vector magnitude exceeds a maximum acceptable error vector magnitude, setting a data point of the peak signal that has the smallest magnitude of the data points of the peak signal to zero.

8. A method for reducing the crest factor of a time domain signal relating to a symbol, the method performed in a transmitter and comprising:
    creating a clipped signal by clipping the time domain signal using a predetermined clipping threshold;
    subtracting the clipped signal from the signal to create a peak signal;

selecting only a predetermined number of data points of the peak signal, wherein the predetermined number of data points are the predetermined number of data points of the peak signal with the highest magnitudes;

generating a filtered peak signal by transforming at least a part of the peak signal into the frequency domain, creating a filtered signal by applying a frequency domain filtering mask to the transformed peak signal and transforming the filtered signal into the time domain;

subtracting the transformed filtered signal from the signal;

wherein an initial peak signal is created prior to receipt of all data points of the time domain signal relating to the symbol and wherein said convolution is started based on the initial peak signal; and wherein further data points are added to the initial peak signal as the further data points are received as part of the time domain signal relating to the said symbol, thereby creating an updated initial peak signal and wherein said convolution is continued based on the updated initial peak signal.

9. A method according to claim 8, further comprising applying complex weights to the data values in the at least part of the peak signal prior to convolution or transformation.

10. An apparatus comprising an input for receiving a time domain input signal, a processor arranged to create a clipped signal by clipping the input signal using a predetermined clipping threshold, to create a peak signal subtracting the clipped signal from the input signal, to select only a predetermined number of data points of the peak signal, wherein the predetermined number of data points are the predetermined number of data points of the peak signal with the highest magnitudes' to convolute at least a part of the peak signal with the inverse Fourier transform of a filtering mask defined in the frequency domain to create a filtered signal, and to create a subtraction signal by subtracting the filtered signal from the input signal;

wherein the input signal relates to a symbol and wherein an initial peak signal is created prior to receipt of all data points of the time domain input signal relating to the symbol and wherein said convolution is started based on the initial peak signal; and wherein further data points are added to the initial peak signal as the further data points are received as part of the time domain input signal relating to the said symbol, thereby creating an updated initial peak signal and wherein said convolution is continued based on the updated initial peak signal.

11. An apparatus according to claim 10, wherein the processor comprises a number of multipliers, the processor arranged to input data values of the peak signal into respective multipliers, the processor further arranged to input values of the inverse Fourier transform of the filter mask into the said respective multipliers, each of the input values of the inverse Fourier transform of the filter mask associated with a respective one of the data values of the peak signal.

12. An apparatus according to claim 10, further comprising a memory storing at least part of the inverse Fourier transform of the filtering mask.

13. An apparatus according to claim 12, further comprising an IFFT processor arranged to perform an inverse Fourier transform of a signal to create the input signal, the IFFT processor further arranged to calculate the inverse Fourier transform of the filtering mask during an idle period and store the inverse Fourier transform of the filtering mask in the memory.

14. An apparatus according to claim 10, further comprising a peak sorting arrangement, arranged to sort the peaks of the input signal in order of magnitude and to select a predetermined number of peaks for convolution.

15. An apparatus according to claim 10, further arranged to convolute said peak signal in real time after a predetermined number of peak signal values have become available for convolution.

16. An apparatus according to claim 10, wherein the processor is further arranged to determine whether the error vector magnitude of the subtraction signal is above a predetermined threshold and to set a smallest non-zero value of the peak signal that has been used or that would be used in creating the subtraction signal to zero prior to the convoluting.

17. An apparatus for reducing the crest factor of a time domain signal comprising a signal input for receiving the time domain signal and a processor arranged to:

create a clipped signal by clipping the signal using a predetermined clipping threshold;

create a peak signal by subtracting the clipped signal from the input signal;

select only a predetermined number of data points of the peak signal, wherein the predetermined number of data points are the predetermined number of data points of the peak signal with the highest magnitudes;

transform the at least a part of the peak signal into the frequency domain;

create a filtered signal by applying a frequency domain filtering mask to the transformed peak signal;

transform the filtered signal into the time domain; and subtract the transformed filtered signal from the signal;

wherein the time domain signal relates to a symbol and wherein an initial peak signal is created prior to receipt of all data points of the time domain signal relating to the symbol and wherein said convolution is started based on the initial peak signal; and wherein further data points are added to the initial peak signal as the further data points are received as part of the time domain signal relating to the said symbol, thereby creating an updated initial peak signal and wherein said convolution is continued based on the updated initial peak signal.

18. An apparatus according to claim 17, the processor further arranged to apply complex weights to the at least a part of the peak signal prior to convolution or transformation.

* * * * *